(12) United States Patent
Huang

(10) Patent No.: US 6,959,790 B2
(45) Date of Patent: Nov. 1, 2005

(54) ANTILOCK DISC BRAKE

(76) Inventor: Tan Cheng Huang, 6Fl., No.2-1, Swei St., Taichung (TW)

( * ) Notice: Subject to any disclaimer, the term of this patent is extended or adjusted under 35 U.S.C. 154(b) by 0 days.

(21) Appl. No.: 10/496,035

(22) PCT Filed: Jul. 14, 2003

(86) PCT No.: PCT/CN03/00558

§ 371 (c)(1),
(2), (4) Date: May 18, 2004

(87) PCT Pub. No.: WO2004/036081

PCT Pub. Date: Apr. 29, 2004

(65) Prior Publication Data
US 2005/0039989 A1 Feb. 24, 2005

(30) Foreign Application Priority Data

Oct. 15, 2002 (CN) .............................. 02281655 U
Jan. 3, 2003 (CN) .............................. 03200060 U

(51) Int. Cl.⁷ .............................................. B62L 1/06
(52) U.S. Cl. ..................... 188/24.19; 188/26; 188/71.8
(58) Field of Search .............................. 188/26, 24.19, 188/24.21, 24.12, 218 XL, 17, 18 A, 71.7, 188/71.8, 181 A, 181 T; 303/113.1, 137

(56) References Cited

U.S. PATENT DOCUMENTS

| | | | | |
|---|---|---|---|---|
| 5,979,609 A | * | 11/1999 | Tsai | 188/26 |
| 6,148,964 A | * | 11/2000 | Huang | 188/26 |
| 6,230,850 B1 | * | 5/2001 | Huang | 188/24.21 |
| 6,334,513 B1 | * | 1/2002 | Chern | 188/71.7 |
| 6,349,800 B1 | * | 2/2002 | Nakamura | 188/26 |
| 6,382,365 B1 | * | 5/2002 | Chen | 188/26 |
| 6,425,464 B2 | * | 7/2002 | Lumpkin et al. | 188/24.12 |
| 6,659,234 B1 | * | 12/2003 | Huang | 188/26 |
| 6,666,304 B1 | * | 12/2003 | Huang | 188/24.19 |
| 6,745,874 B1 | * | 6/2004 | Huang | 188/26 |

* cited by examiner

Primary Examiner—Mariano Sy
(74) Attorney, Agent, or Firm—Charles E. Baxley

(57) ABSTRACT

The present invention relates to a brake device for a bike, and more particularly to an antilock disc brake device, which is mounted to the front/back fork of a bike, and includes a slider, plural steel balls, a fluted disc and a shaft pad. The present invention is not only capable of preventing the brake from locking up, but also it prevent unstable ride caused by a sudden brake at high speed.

10 Claims, 15 Drawing Sheets

ANTILOCK DISC BRAKE

BACK GROUND OF THE INVENTION

1. Field of the Invention

The present invention relates to a brake device for a bike, and more particularly to an antilock disc brake device, which is mounted to the front/back fork of a bike, and includes a slider, plural steel balls, a fluted disc and a shaft pad. The present invention is not only capable of preventing the brake from locking up, but also prevent unstable shaking caused in a sudden brake at high speed.

2. Description of the Prior Arts

The operating principle of most of the conventional disc brake devices used on different bikes (including: bicycle, sliding bicycle, electric bicycle and the likes) is to pull a braking assembly with a steel wire, then to drive two opposing braking blocks to clamp the brake disc from both sides, so as to stop the bike with the friction force between the braking blocks and the brake disc. However, this kind of disc brake device still has some disadvantages that are to be explained in details as follows:

Referring to FIG. 1, wherein the conventional disc brake device includes a brake arm assembly 10, a braking assembly 11 and a steel wire. The disc brake device is mounted to a fork 14 of a bike, and the braking assembly 11 is correspondingly mounted at both sides of the brake disc 13. When the brake is applied, the steel wire 12 will cooperate with the brake arm assembly 10 to make the braking assembly 11 clamp the brake disc 13 from both sides 13, and thus generate a braking effect. The clamping force is very great, so the braking effect of this disc brake device is relatively better, and it has been widely used on all kinds of bikes. However the problems of this disc brake device are:

Since the braking force produced in a sudden brake is usually greater than the friction force of the wheel, thus the braking assembly 11 and the brake disc 13 will be locked up, such that not only the wheel will be locked up (stop rolling), but also a sudden shaking of the bike will be caused, thereby the rider may lose balance and easily leading to an accident.

The present invention has arisen to mitigate and/or obviate the afore-described above-mentioned disadvantages.

SUMMARY OF THE INVENTION

The primary object of the present invention is to provide an antilock disc brake device, which includes a slider, plural steel balls, a fluted disc, a shaft pad and a toothed board. When the inertial force caused by a sudden brake at high speeds is larger than the elastic force of the spring, the disc brake will be actuated to reciprocate along a track predetermined in a slider, synchronously the positioning assembly is actuated to move and the fluted disc is actuated to rotate, the rotation of the fluted disc can release the frictional contact between the brake pad and the brake disc. In this way, the brake can be prevented from locking up.

The secondary object of the present invention is to provide an antilock disc brake device, wherein the braking force can be regenerated instantly after the brake pad is released from the disc, the inertial force of the bike is reduced to a value minor than the elastic force of the spring, in this case, the slider of the brake will be pushed instantly back to its original position by the spring. At the same time, the slider pushes the positioning assembly and the fluted disc to move, and then further pushes the shaft pad and the brake pad back to the original position as it was when the brake is not applied. Thereby, it ensures that there is no window period in braking action.

The third object of the present invention is to provide an antilock disc brake device, which is not provided with any electronic and electric devices, thereby the production cost can be reduced.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
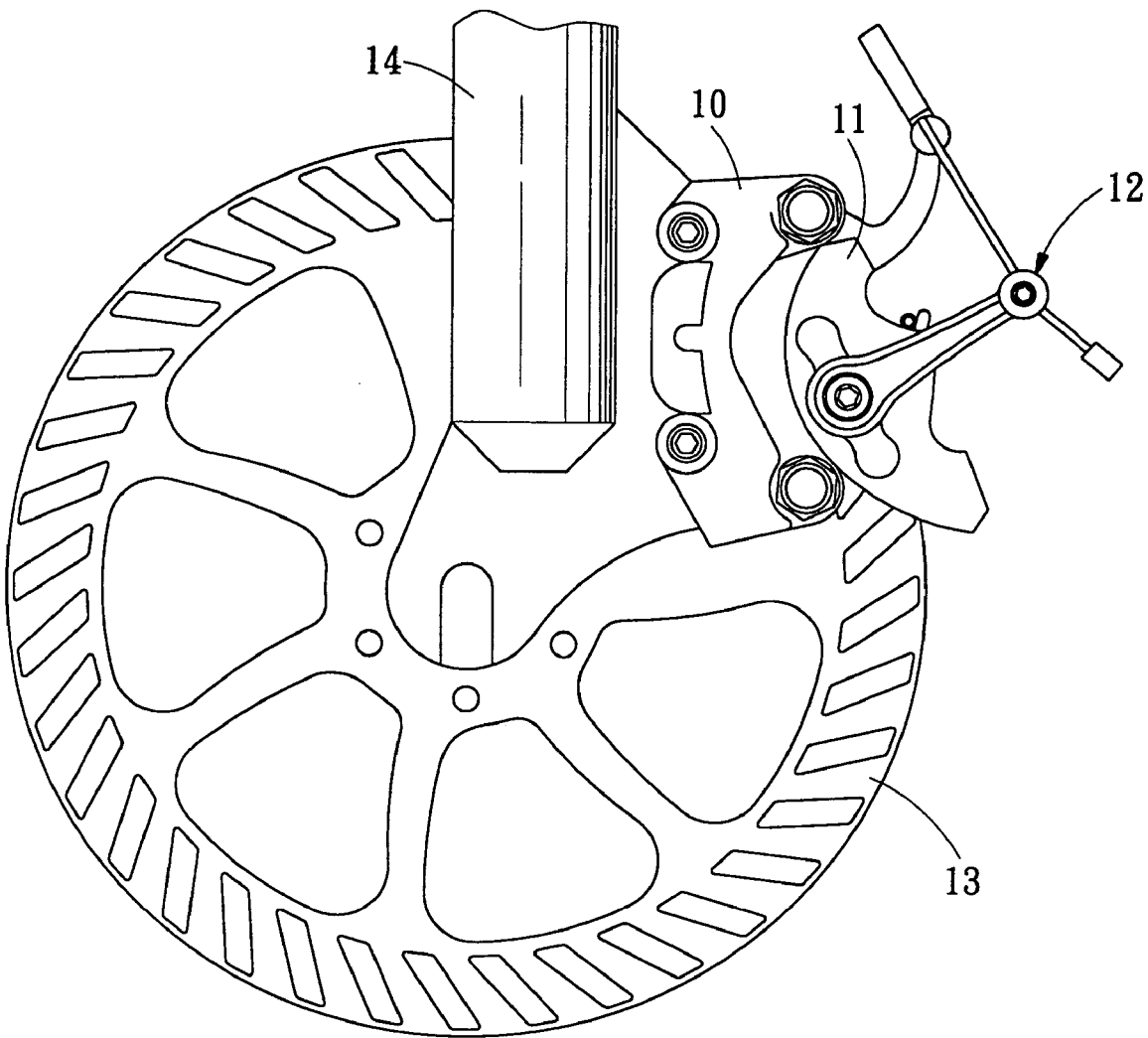
FIG. 1 is a structural view of a conventional disc brake device.
Figure 2:
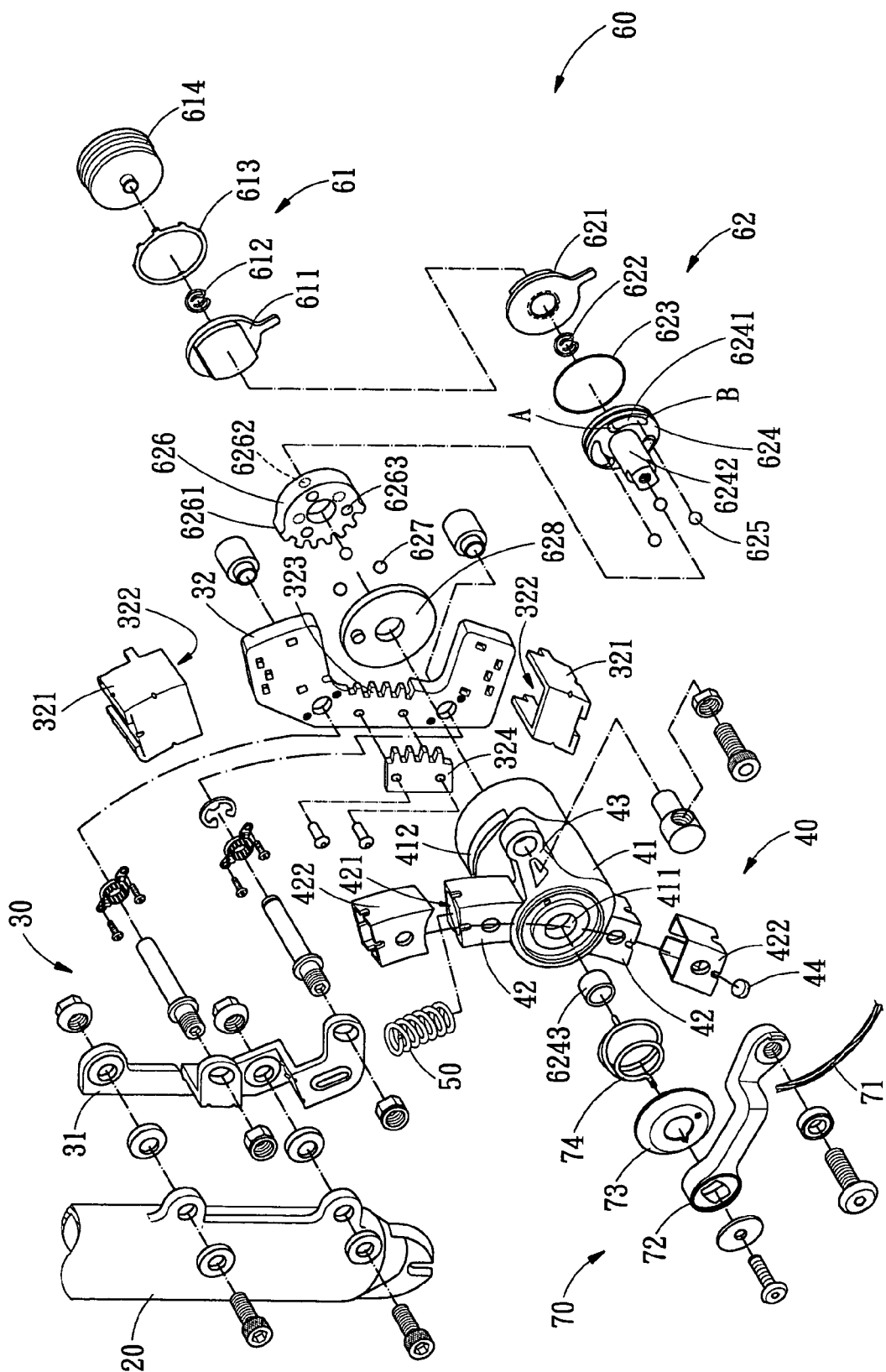
FIG. 2 is an exploded view of an antilock disc brake device in accordance with the present invention.
Figure 3:
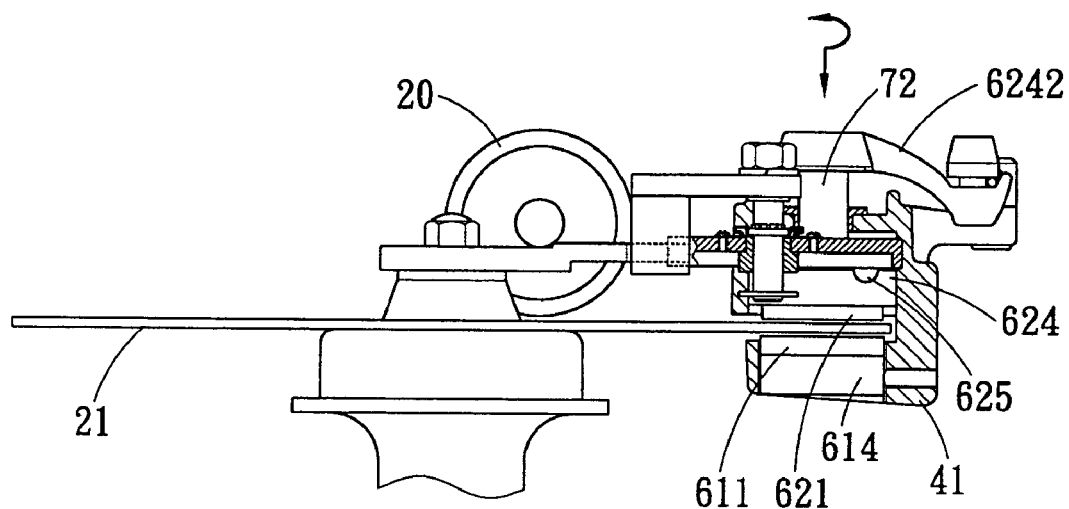
FIG. 3 is a cross sectional view of an antilock disc brake device in accordance with a first embodiment of the present invention.
Figure 4:
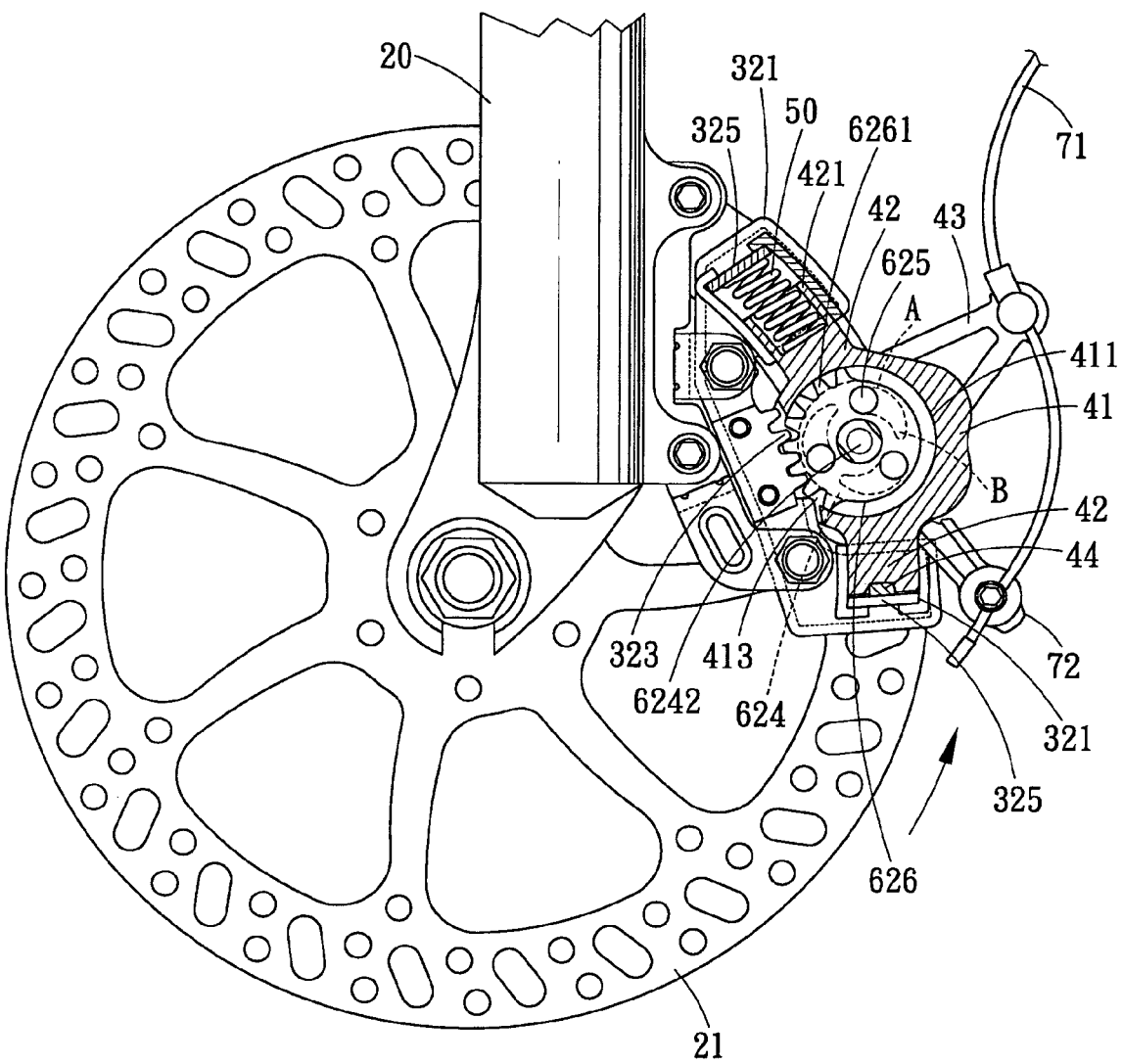
FIG. 4 is an operational view of an antilock disc brake device in accordance with a first embodiment of the present invention.

Referring to FIGS. 2–4, the antilock brake device in accordance with the present invention is mounted to the front/rear fork 20 of a bike and corresponds to a brake disc 21, which includes a positioning assembly 30, a slider 40, a spring 50, a braking assembly 60 and a rocker-arm assembly 70.

The positioning assembly 30 comprises a positioning bracket 31 and a toothed board 32, wherein the positioning bracket 31 is assembled with the toothed board 32 and then screwed on the fork 20. At a side of the toothed board 32 are circularly provided with two positioning covers 321, and the arc between the two positioning covers 321 corresponds to the axis of the brake disc 21. The positioning covers 321 are respectively defined with a receiving hole 322, and a back plate 325 is disposed at the bottom of the receiving hole 322. Plural teeth 323 are formed at the mid portion of the toothed board 32 for meshing with a toothed plate 324 (the toothed plate 324 is also defined with teeth). The teeth 323 are disposed between the two positioning covers 321.

The slider 40 comprises a base body 41 and two sliding sleeves 42 respectively disposed at an upper side and a lower side of the base body. The sliding sleeves 42 are respectively defined with a receiving base 421 at an end thereof, the receiving base 421 of the sliding sleeve 42 at the lower end of the base body 41 is interiorly provided with cushion 44. The two sliding sleeves 42 can respectively slide into the two positioning covers 321 of the positioning assembly 30. The base body 41 is laterally defined with a through hole 411, at a side of the through hole 411 is formed with a first gap 412 and a second gap 413. The second gap 413 corresponds to the teeth 323 of the positioning assembly 30, while the first gap 412 serves to receive the brake disc 21. At the outer periphery of the base body 41 is defined with an arm 43, and the two sliding sleeves 42 are respectively covered with a wearing sleeve 422.

The spring 50, an end of which is received in the receiving base 421 of the sliding sleeve 42 at the upper end of the slider 40 and another end of the spring 50 abuts against the back plate 325 of the positioning cover 321 at the upper end of the positioning assembly 30.

The braking assembly 60 includes a first braking unit 61 and a second braking unit 62. The first braking unit 61 comprises a brake pad 611, a retainer 612, an abrasive piece 613 and an adjust cover 614, the first braking unit 61 is disposed at a first side of the through hole 411 of the slider 40 such that the first brake pad 611 corresponds to the first side of the brake disc 21. The second braking unit 62 is disposed at a second side of the through hole 411 of the slider 40, which includes a brake pad 621, a retainer 622, a dust washer 623, a shaft pad 624, plural steel balls 625, a fluted disc 626, a plural steel balls 627 and a wearing gasket 628. The brake pad 621 corresponds to the second side of the brake disc 21. The shaft pad 624 is provided at a side surface thereof with plural teardrop shaped grooves 6241, each of the grooves 6241 has a wide deep end A and a narrow shallow end B. A drive shaft 6242 is provided at the same side of the shaft pad 624 and rotatably projected out of the through hole 411 of the slider 40 by cooperating with a bearing 6243. The plural steel balls 625 are rotatablly received in the teardrop shaped grooves 6241. The fluted disc 626 is defined with teeth 6261 so as to mesh with the teeth 323 of the positioning assembly 30, and which is further defined with plural cavities 6262 for positioning the steel balls 625. At another side of the fluted disc 626 is also defined with plural cavities 6263 for positioning the steel balls 627, so as to reduce the rotary friction of the fluted disc 626. The wearing gasket 628 is defined at the center thereof with an aperture for insertion of the drive shaft 6242 of the shaft pad 624 and to be disposed in a positioning hole predetermined at a side of the through hole 411 of the slider 40.

The rock-arm assembly 70 includes a steel wire 71, a rock arm 72, a cover 73 and a spiral spring 74. The drive shaft 6242 of the braking assembly 60 is disposed at an end of the rock arm 72 after passing through the cover 73 and the spiral spring 74, while the steel wire 71 is fixed to another end of the rock arm 72 after passing through the arm 43 of the slider 40.

Figure 5:
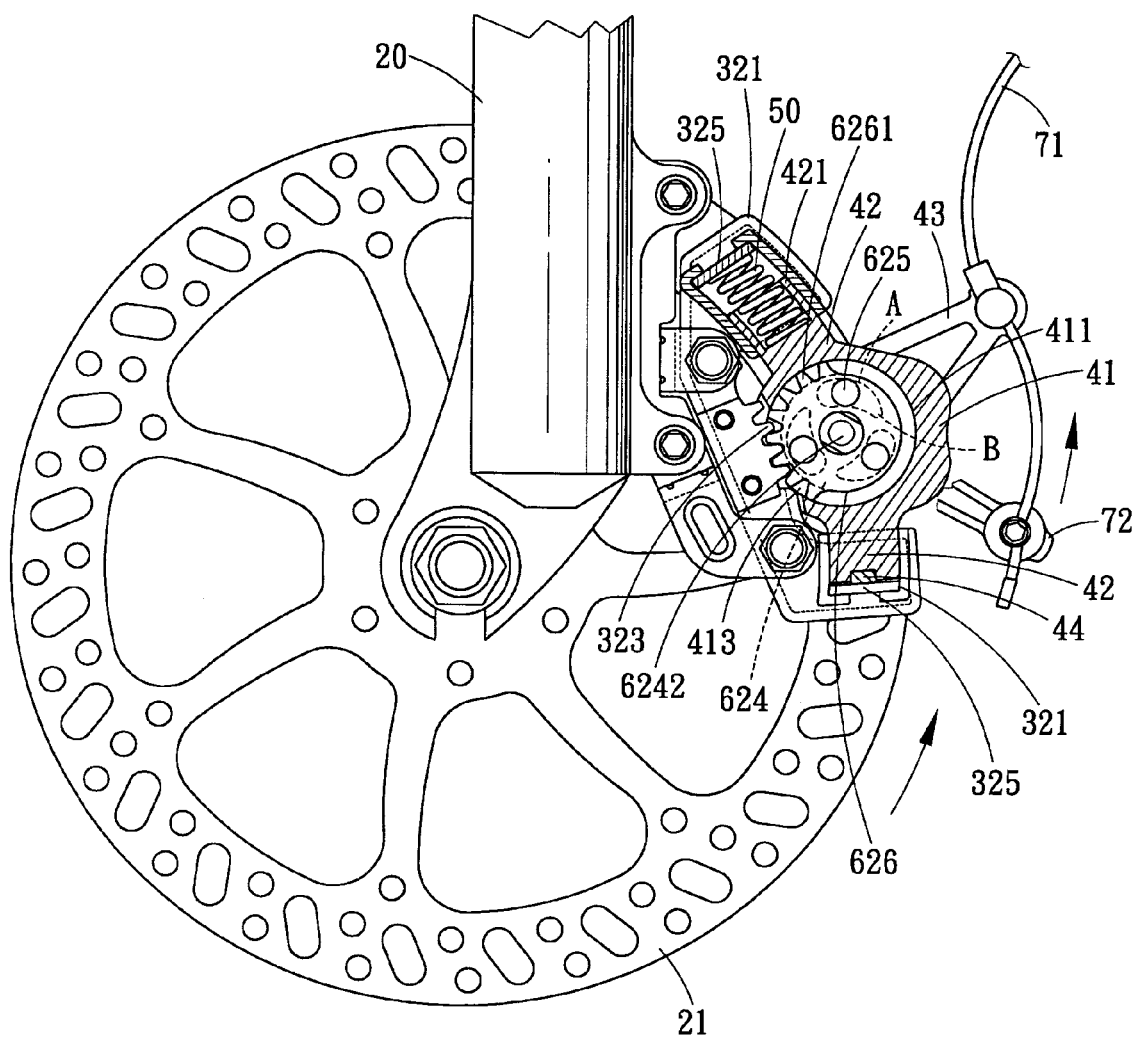
FIG. 5 is another operation view of an antilock disc brake device in accordance with a first embodiment of the present invention.
Figure 6:
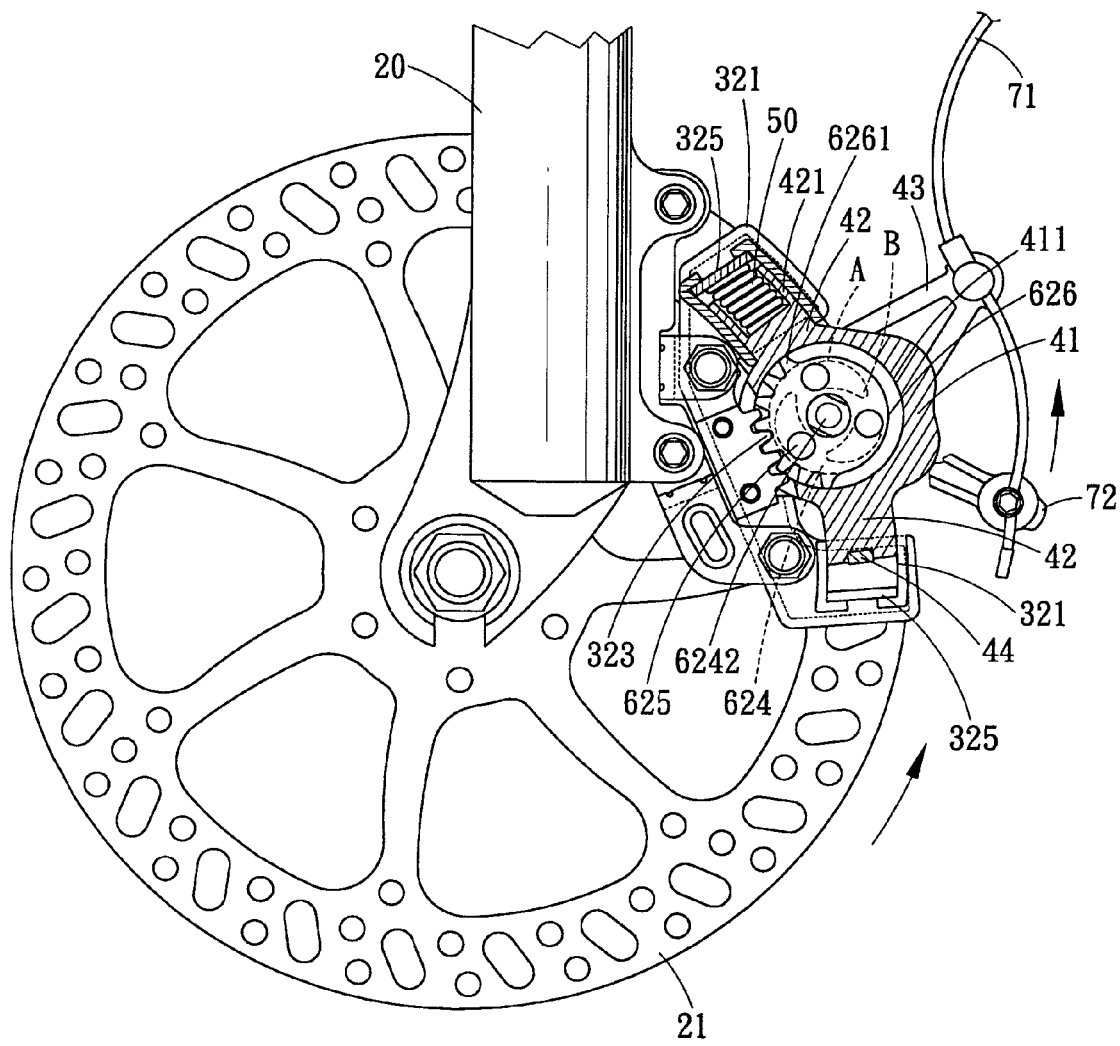
FIG. 6 is another operation view of an antilock disc brake device in accordance with a first embodiment of the present invention.

Referring to FIGS. 4–6, when the bike is running and the brake is not being pressed, the brake disc 21 counterclockwise rotates along with the rotation of the wheel and the steel wire 71 of the rock-arm assembly 70 is not being pulled, such that the rock arm 72 stands still. At this moment, the first braking unit 61 and the second braking unit 62 of the braking assembly 60 don't contact the both side surfaces of the brake disc 21, the steel balls 625 are received in the deep end A of the respective tear-drop shaped grooves 6241, and the slider 40 is being abutted by the spring 50, in this case, the sliding sleeve 42 at the lower side of the slider 40 will abut against the back plate 325 of the positioning cover 321 of the positioning assembly 30 with the cushion 44 in the receiving base 421. Thereby, the wheels of the bike can rotate freely.

When the brake is suddenly depressed at high speed, the brake disc 21 is still rotating along with the rotation of the wheel, while the steel wire 71 of the rock-arm assembly 70 is suddenly counterclockwise pulled, such that the rock arm 72 will swing at once. At the same time, the shaft pad 624 of the second braking unit 62 of the braking assembly 60 is suddenly driven by the drive shaft 6242 to rotate counterclockwise, which causes movement of the steel balls 625 from the deep end A to the shallow end B of the respective tear-drop grooves 6241. As a result, the respective steel balls 625 will push the shaft pad 624 and the fluted disc 626 outward, and the shaft pad 624 synchronously pushes the brake pad 621 to approach the brake disc 21, such that the brake pads 621, 611 clamp the brake disc from both sides so as to stop the brake disc 21 with a force in counter direction (as shown FIG. 5).

When the brake is being depressed, after the brake pads 621, 611 are applied with the counterclockwise stress of the brake disc 21, a very huge counterclockwise stress corresponding to the axis of the brake disc 21 will be exerted on the brake pads 621, 611. Since the arc between the two positioning covers 321 of the toothed plate 32 corresponds to the axis of the brake disc 21 and in which the two sliding sleeves 42 at upper/lower ends of the slider 40 are rotatablly received, the slider 40 will be driven instantly to slide by the counterclockwise stress. At this moment, the inertial force of the bike at high speed is greater than the critical elastic force of the spring 50, such that the spring 50 is compressed (as shown in FIG. 6) and synchronously the positioning assembly 30 and the fluted disc 626 are actuated.

After that, since the teeth 323 of the positioning assembly 30 are fixed, the fluted disc 626 will be driven to rotate by its own movement, and the steel balls 625 will roll along with the fluted disc 626 from the shallow end B to the deep end A of the respective tear-drop shaped grooves 6241 and will not push the shaft pad 624 and the fluted disc 626 to move outward anymore. Accordingly, the braking pad 621 will not clamp the brake disc 21 any longer, at the moment, the counterclockwise stress of the brake is not applied on the slider 40, thereby the slider 40 will be pushed back to its original position by the spring 50. Meanwhile, the positioning assembly 30 and the fluted disc 626 are actuated to move back to their original positions too, so the steel balls 625 move again from the deep end A to the shallow end B of the respective tear-drop grooves 6241 (the rider keeps pulling the steel wire 71), in this case, the braking pads 621, 611 will instantly clamp the surfaces of the brake disc 21 from both sides. In this way, the present invention can achieve an antilock effect.

Figure 7:
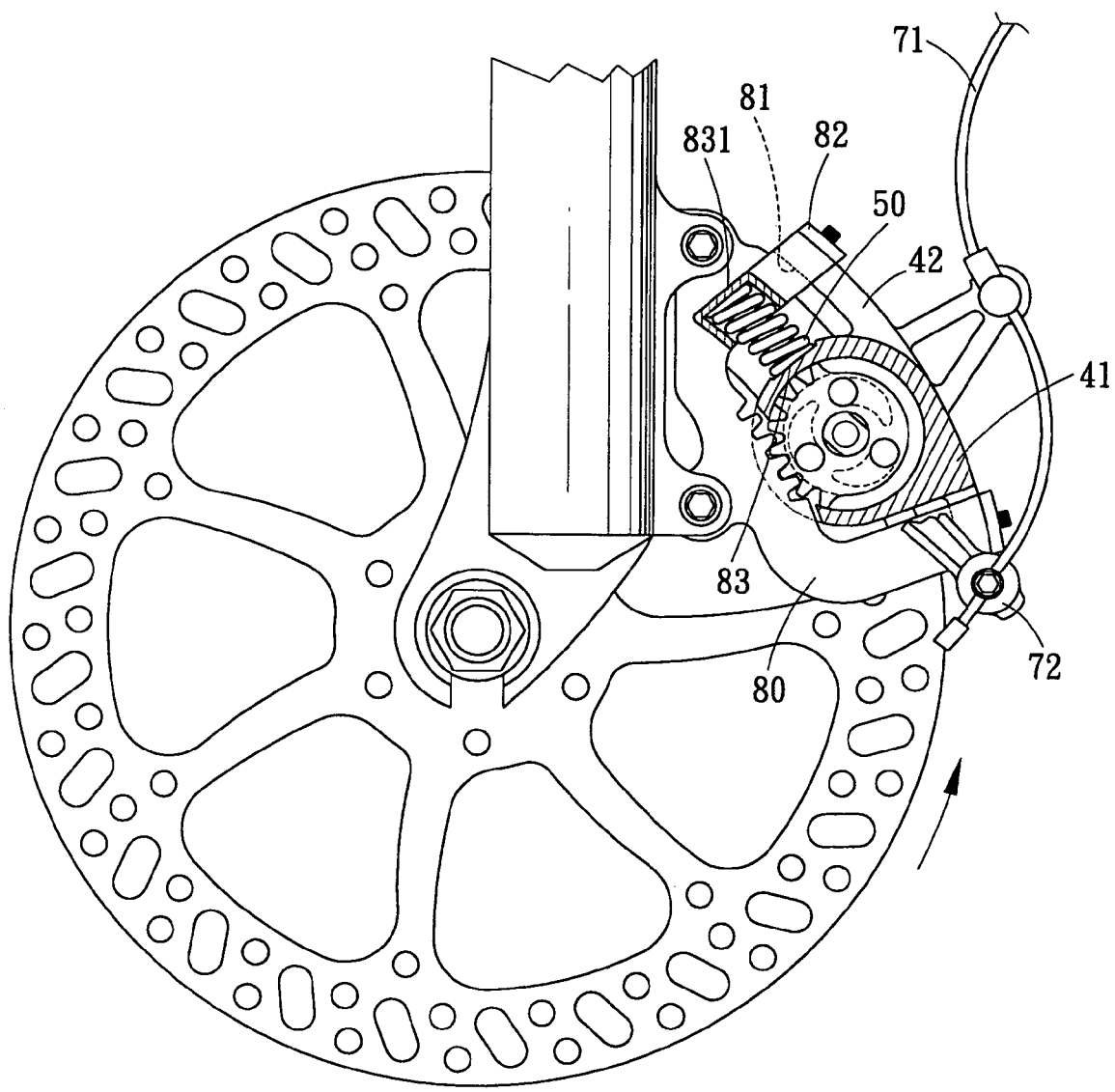
FIG. 7 is a cross sectional view of an antilock disc brake device in accordance with a second embodiment of the present invention.

Referring to FIG. 7, which shows an antilock brake device in accordance with a second embodiment of the present invention, wherein the positioning assembly 80 is an integral combination of the positioning bracket 31 and the toothed board 32. And the two positioning covers 321 are replaced by two corresponding sliding grooves 81 and limiting covers 82 are used to position the two sliding sleeves 42 at both sides of the slider 40. The base body 41 is additionally provided with a spring seat 83 for the reception of an end of the spring 50 and at a corresponding position of the positioning assembly 80 is provided with another spring seat 831. By such arrangements, the slider 40, the spring 50, the braking assembly 60 and the rock-arm assembly 70 in accordance with the second embodiment of the present invention also can work well with other so as to prevent the brake disc from locking up when a sudden brake is being applied.

Figure 8:
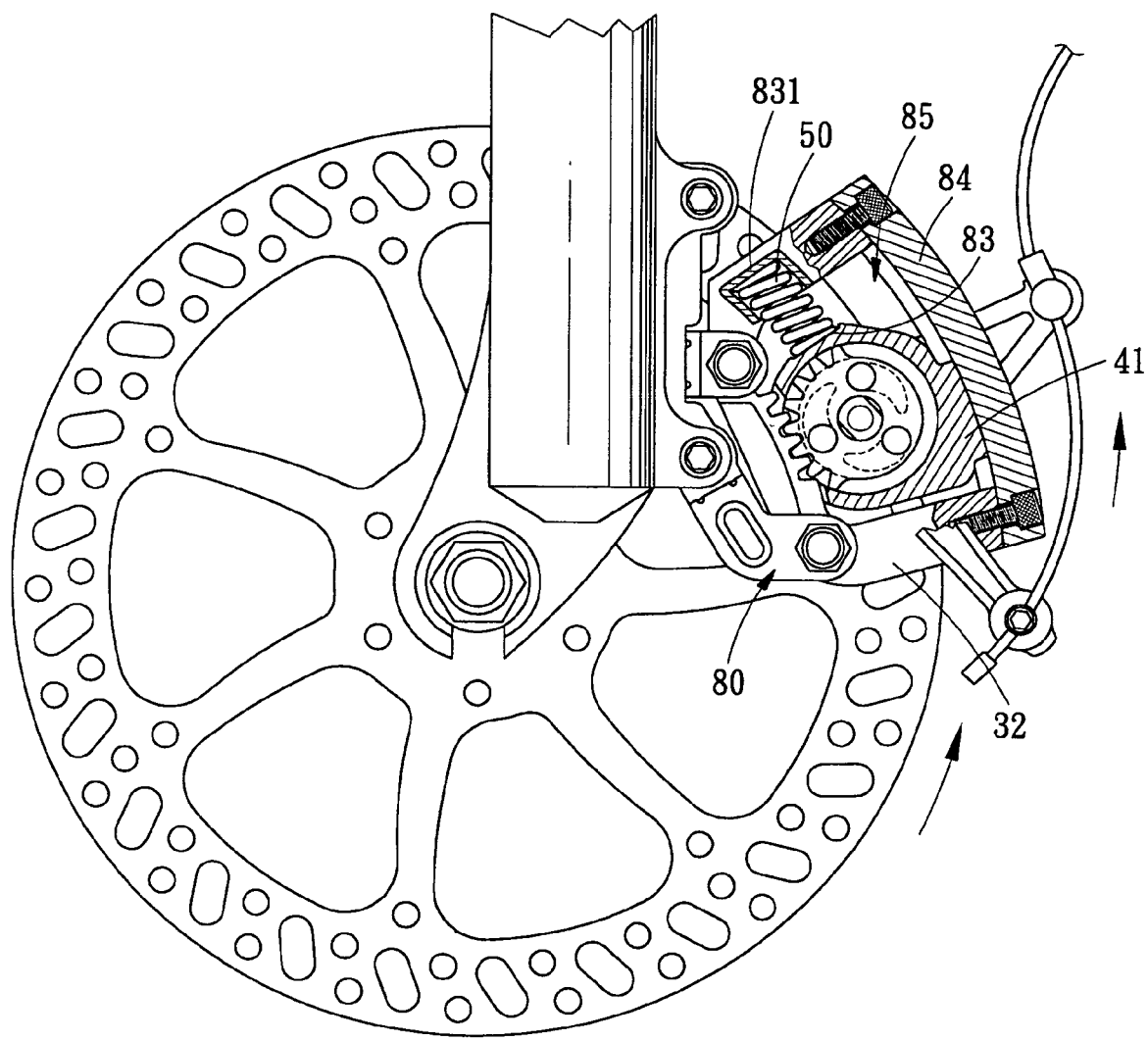
FIG. 8 is an operational view of an antilock disc brake device in accordance with a third embodiment of the present invention.

Referring to FIG. 8, which shows an antilock brake device in accordance with a third embodiment of the present invention, wherein the distinction of the positioning assembly 80 compared with the first embodiment is that the positioning covers 321 of the teethed board 32 are changed into rail 85 formed by slide cover 84, such that the base body 41 can abut against and slide on the rail 85. The base body 41 is additionally provided with a spring seat 83 for reception of an end of the spring 50, and at a corresponding position of the toothed board 32 is defined with another spring seat 831. By such arrangements, the base body 41 can perform curve motion reciprocally by cooperating with the rail 85, and the slider 40, the spring 50, the braking assembly 60 and the rock-arm assembly 70 in accordance with the third embodiment of the present invention also can work well with other, such that it not only can prevent the brake disc from locking up when a sudden brake is applied, but also can prevent unstable shaking caused in a sudden brake at high speed.

Figure 9:
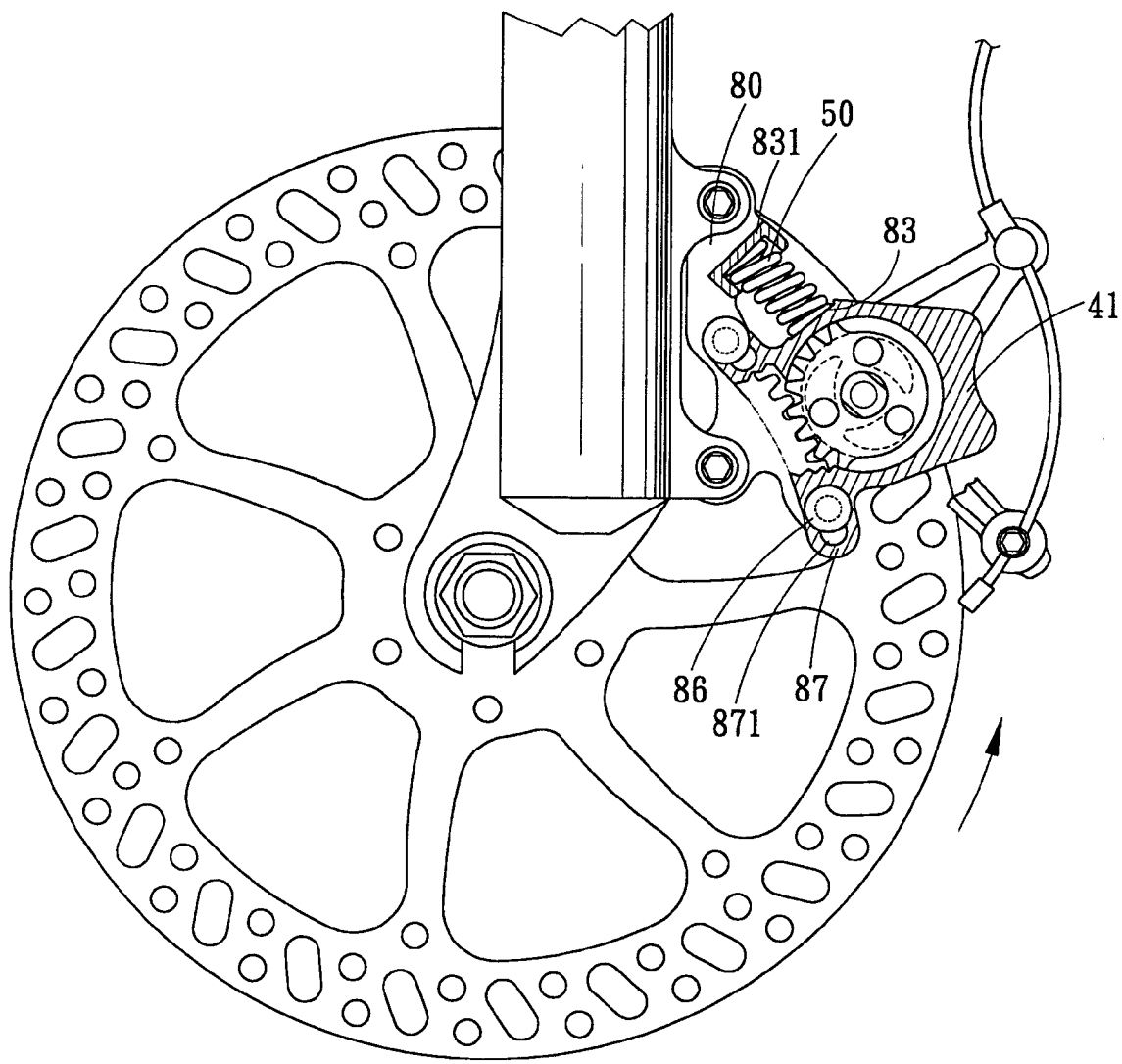
FIG. 9 is an operational view of an antilock disc brake device in accordance with a fourth embodiment of the present invention.

Referring to FIG. 9, which shows an antilock brake device in accordance with a fourth embodiment of the present invention, wherein the positioning assembly 80 is integrally formed by the positioning bracket 31 and the toothed board 32, and the positioning covers 321 are changed into two opposing slide shafts 86. Moreover, the both ends of the base body 41 of the slider 40 are provided with ears 87 that defined 20 with arc apertures 871. The arc apertures 871 of the ears 87 at both ends of the base body 41 are provided for the insertion the slide shaft 86 respectively, so as to enable the base body 41 to perform curve movement reciprocally in the arc apertures 871. The base body 41 is additionally provided with a spring base 83 for the reception of an end of the spring 50, while at a corresponding position of the positioning assembly 80 is provided with another spring cover 831. The slider 40, the spring 50, the braking assembly 60 and the rock-arm assembly 70 in accordance with the fourth embodiment of the present invention also can work well with other, such that the present invention not only can prevent the brake disc from locking up when a sudden brake is applied, but also can prevent unstable shaking caused in a sudden brake at high speed.

Figure 10:
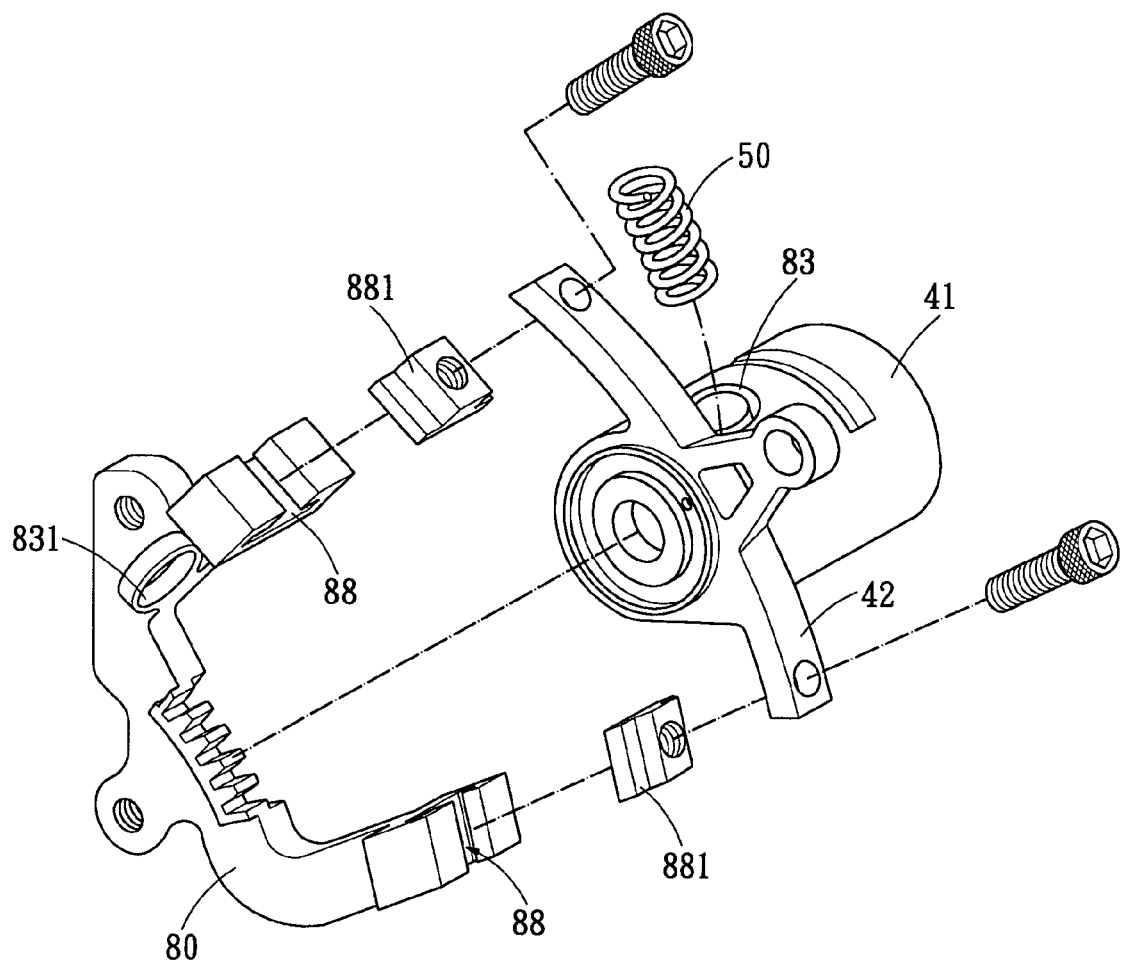
FIG. 10 is a partial exploded view of an antilock disc brake device in accordance with a fifth embodiment of the present invention.

Referring to FIG. 10, which shows an antilock brake device in accordance with a fifth embodiment of the present invention, wherein the positioning assembly 80 is integrally formed by the positioning bracket 31 and the toothed board 32, and the positioning covers 321 are changed into two opposing T-shape arc grooves 88. Two T-shape slide blocks 881 are disposed at the end of the sliding sleeves 42 at both ends of the base body 41, and the two T-shape slide blocks 881 are used to insert in the T-shape arc grooves 88, by the cooperation of the T-shape arc grooves 88 with the T-shape slide blocks 881, the base body 41 can perform curve movement reciprocally in the T-shape arc grooves 88. The base body 41 is additionally provided with a spring base 83 for the reception of an end of the spring 50, while at a corresponding position of the positioning assembly 80 is provided with another spring cover 831. The slider 40, the spring 50, the braking assembly 60 and the rock-arm assembly 70 in accordance with the fifth embodiment of the present invention also can work well with other, such that the present invention not only can prevent the brake disc from locking up when a sudden brake is applied, but also can prevent unstable shaking caused in a sudden brake at high speed.

Figure 11:
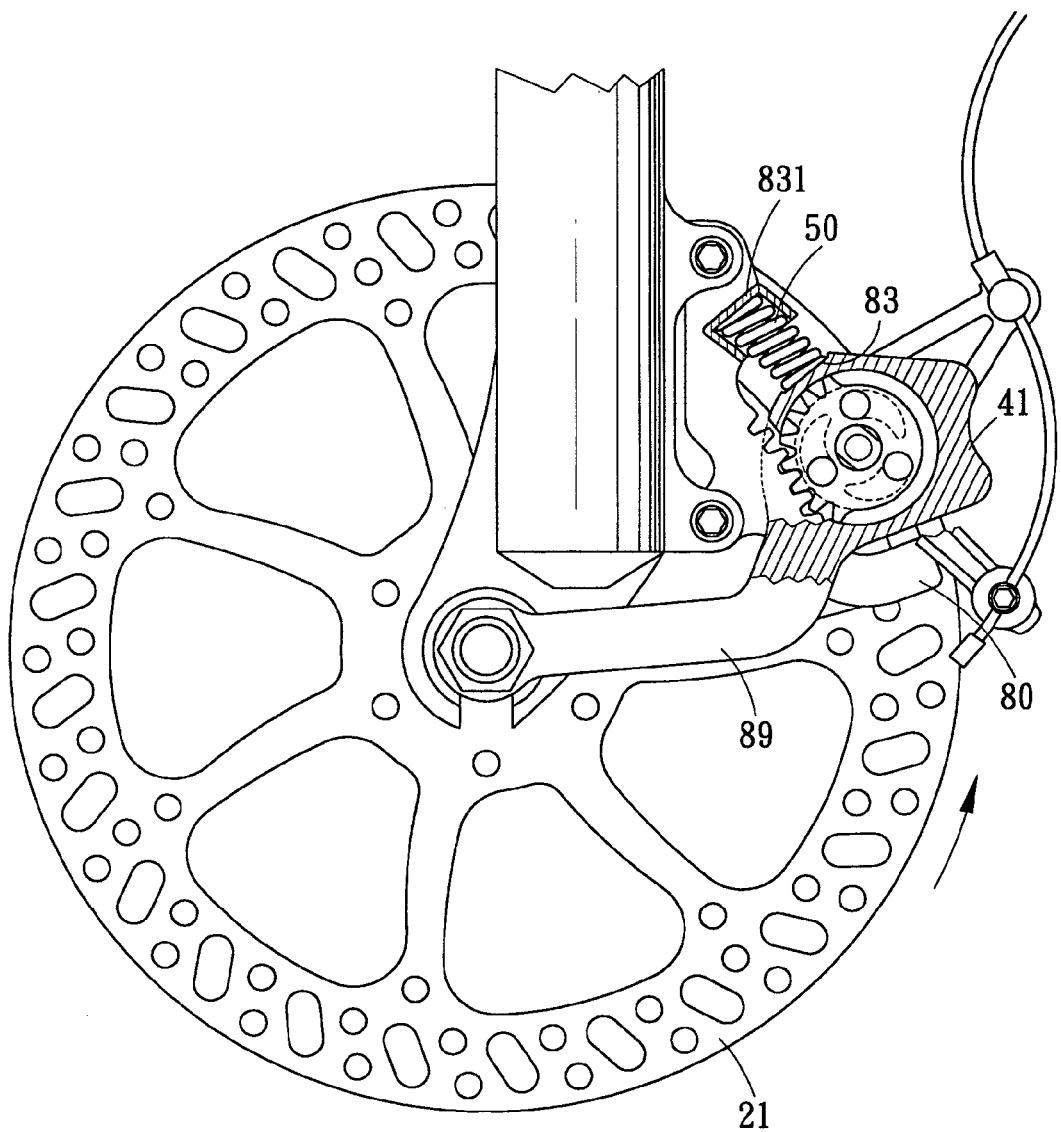
FIG. 11 is an operational view of an antilock disc brake device in accordance with a sixth embodiment of the present invention.

Referring to FIG. 11, which shows an antilock brake device in accordance with a sixth embodiment of the present invention, wherein the positioning assembly 80 is integrally formed by the positioning bracket 31 and the toothed board 32. The positioning covers 321 and the sliding sleeves 42 are cancelled, and plate 89 protrudes from a side of the base body 41 of the slider 40, the plate 89 is pivotally connected to the axis of the brake disc 21. In this case, the base body 41 can perform arc-reciprocating movement. The base body 41 is additionally provided with a spring base 83 for the reception of an end of the spring 50, while at a corresponding position of the positioning assembly 80 is provided with another spring cover 831. The slider 40, the spring 50, the braking assembly 60 and the rock-arm assembly 70 in accordance with the sixth embodiment of the present invention also can work well with other, such that the present invention not only can prevent the brake disc from locking up when a sudden brake is applied, but also can prevent unstable shaking caused in a sudden brake at high speed.

Figure 12:
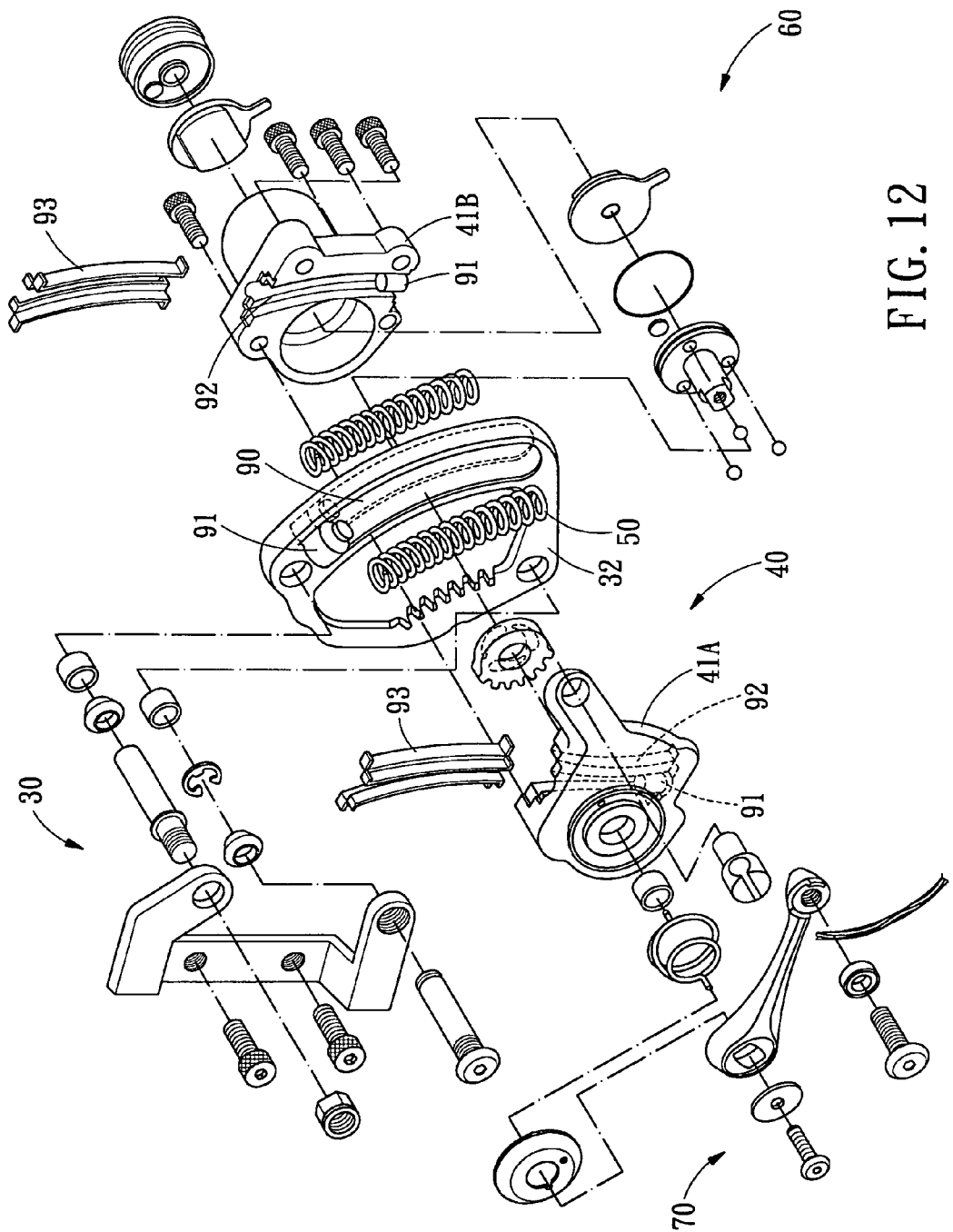
FIG. 12 is an exploded view of an antilock disc brake device in accordance with a seventh embodiment of the present invention.
Figure 13:
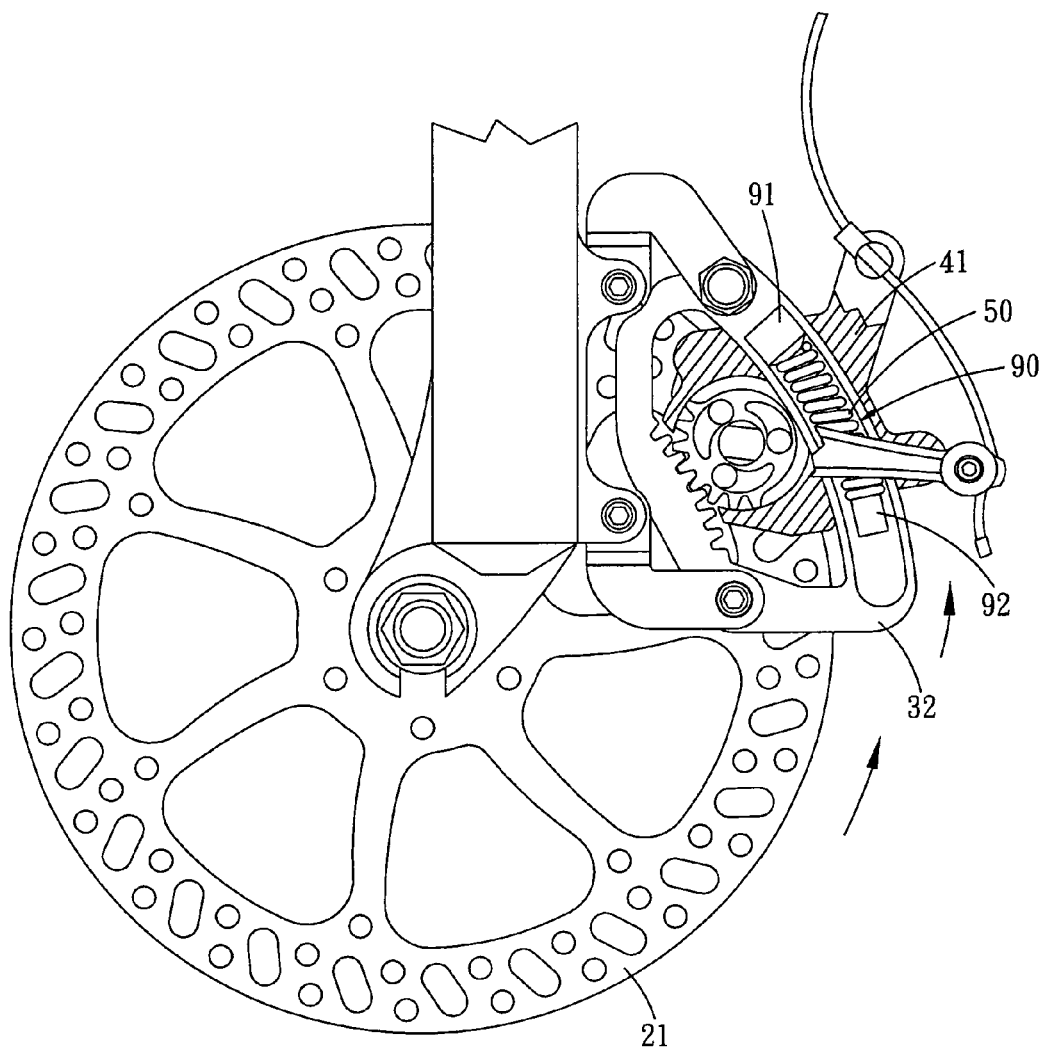
FIG. 13 is an operational view of an antilock disc brake device in accordance with a seventh embodiment of the present invention.

Referring to the FIGS. 12 and 13, which shows an antilock brake device in accordance with a seventh embodiment of the present invention, wherein the toothed board 32 is defined with a track 90 that interiorly provided with two spring seats 91 for positioning the two springs 50. The base body 41 of the slider 40 is divided into a left half 41A and a right half 41B (which are screwed together). The left half 41A and the right half 41B are correspondingly provided outside of the track 90 of the toothed board 32 and respectively positioned at both sides of the track 90 by taking advantage of the chute board 93 in the arc groove 92. Furthermore, on the inner surface of arc groove 92 are provided with spring seats 91 which correspond to the springs 50, by the cooperation of the track 90 with the two springs 50 and the chute board 93, the base body 41 is able to perform arc movement reciprocally. The base body 41 is additionally provided with a spring base 83 for the reception of an end of the spring 50, while at a corresponding position of the positioning assembly 80 is provided with another spring cover 831. The slider 40, the spring 50, the braking assembly 60 and the rock-arm assembly 70 in accordance with the seventh embodiment of the present invention also can work well with other, such that the present invention not only can prevent the brake disc from locking up when a sudden brake is applied, but also can prevent unstable shaking caused in a sudden brake at high speed.

Figure 14:
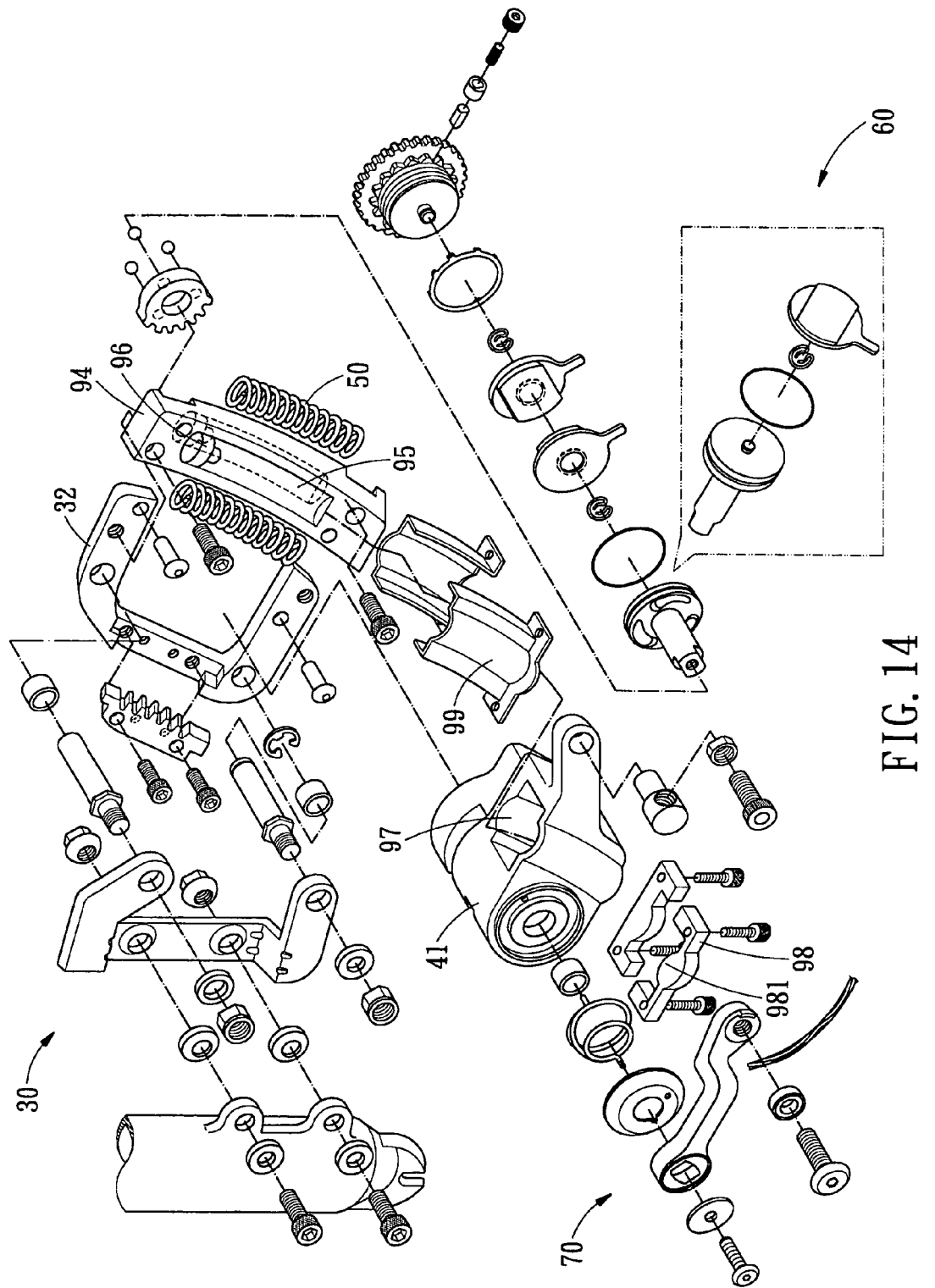
FIG. 14 is an exploded view of an antilock disc brake device in accordance with an eighth embodiment of the present invention.
Figure 15:
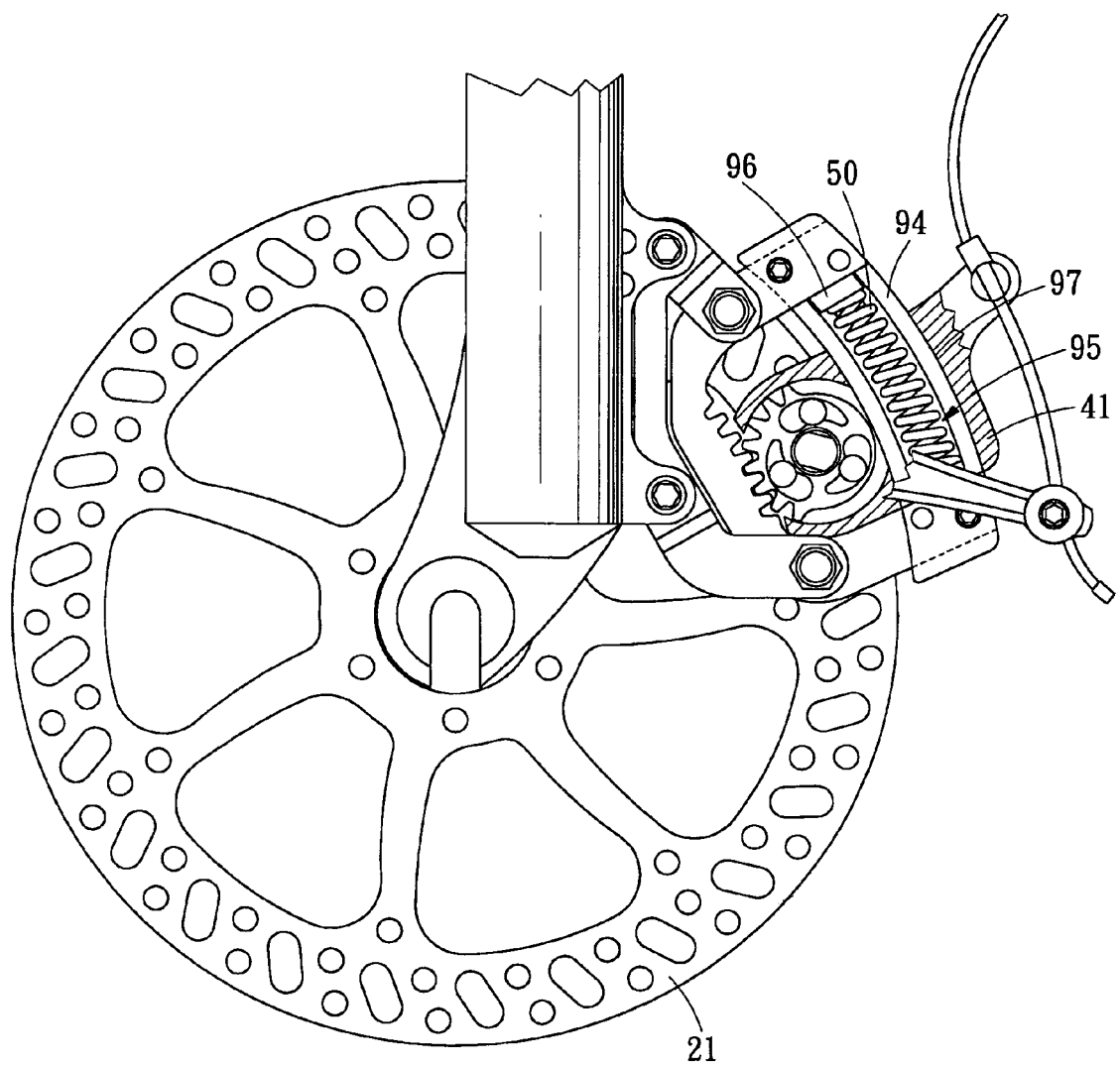
FIG. 15 is an operational view of an antilock disc brake device in accordance with an eighth embodiment of the present invention.

Referring to FIGS. 14 and 15, which shows an antilock brake device in accordance with a eighth embodiment of the present invention, wherein the toothed board 32 is provided with a rail 94 that is interiorly defined with two recesses 95 for the reception of the springs 50. In the recesses 95 is further provided with spring seats 96 that are used to position the springs 50. The base body 41 is defined with an arc hole 97, and the arc-shape sleeves 99 are positioned in the arc hole 97 by virtue of two screw boards 98. The rail 94 is inserted in the arc-shape sleeves 99, each of the screw boards 98 is defined with an abutting portion 981 that is used to abut against the bottom of the recess 95 of the rail 94. The two springs 50 are positioned by the spring seats 96 and the abutting portion 981. Since the rail 94 is limited in the arc hole 97, the base body 41 is able to perform arc movement reciprocally. The slider 40, the spring 50, the braking assembly 60 and the rock-arm assembly 70 in accordance with the eighth embodiment of the present invention also can work well with other, such that the present invention not only can prevent the brake disc from locking up when a sudden brake is applied, but also can prevent unstable shaking caused in a sudden brake at high speed.

As can be seen from the above embodiments that the antilock disc brake device in accordance present invention has the features and functions as follows:

1) it can prevent the brake from locking up, when the inertial force caused by a sudden brake at high speeds is larger than the elastic force of the spring, the disc brake will be actuated to reciprocate along a track predetermined in a slider, synchronously the positioning assembly is actuated to move and the fluted disc is actuated to rotate, the rotation of the fluted disc can release the frictional contact between the brake pad and the brake disc. In this way, the brake can be prevented from locking up.

2) The braking force can be regenerated instantly after the brake pad is released from the disc, the inertial force of the bike is reduced to a value minor than the elastic force of the spring, in this case, the slider of the brake will be pushed instantly back to its original position by the spring. At the same time, the slider pushes the positioning assembly and the fluted disc to move, and then further pushes the shaft pad and the brake pad back to the original position as it was when the brake is not applied. Thereby, it ensures that there is no window period in braking action.

3) The disc brake device in accordance with the prevent invention is not provided with any electronic and electric devices, thereby the production cost can be reduced.

While we have shown and described various embodiments in accordance with the present invention, it should be clear to those skilled in the art that further embodiments may be made without departing from the scope of the present invention.

What is claimed is:

1. An anti-lock disc brake device mounted on a fork of a bike and corresponds to disc brake;
   a positioning assembly screwed on the fork, and the positioning assembly defined with teeth;
   a slider, a base body of which reciprocating relative to the positioning assembly;
   a spring biased between the slider and the positioning assembly;
   a braking assembly comprising brake pad, shaft pad, plural steel balls and fluted disc, the braking assembly disposed in the slider, the brake pad corresponds to surface of the disc brake, a side surface of the shaft pad defined with plural slots, each of the plural slots formed with shallow end and deep end which used to cooperate with the steel balls respectively, a drive shaft provided at the same side of the shaft pad and rotatably protruding out of the slider, the fluted disc defined with teeth for meshing with the teeth of the positioning assembly, a side of the fluted disc formed with plural cavities for receiving the steel balls;
   a rock-arm assembly comprising a steel wire and a rock arm, the drive shaft of the braking assembly disposed at an end of the rock arm, the steel wire fixed to another end of the rock arm.

2. An anti-lock disc brake device comprising:
   a positioning assembly defined with teeth;
   a slider, a base body of which laterally defined with a through hole, at a side of the through hole formed with a first gap and a second gap; the second gap corresponds to the teeth of the positioning assembly, the first gap serving to receive a brake disc, at an outer periphery of the base body is provided with an arm;
   a spring biased between the base body of the slider and the positioning assembly;
   a braking assembly including a first braking unit and a second braking unit, the first braking unit disposed at a first side of the through hole of the slider, a brake pad of the first braking unit corresponds to a first side of the brake disc, the second braking unit disposed at a second side of the through hole of the slider, the second braking unit comprising a brake pad, a retainer, a dust washer, a shaft pad, plural steel balls, a fluted disc, a plural steel balls and a wearing gasket, the brake pad of the second braking unit corresponds to the second side of the brake disc, the shaft pad provided at a side surface thereof with plural teardrop shaped grooves, each of the teardrop shaped grooves has a wide deep end and a narrow shallow end, a drive shaft rotatably projecting out of the through hole of the slider, the plural steel balls received in the teardrop shaped grooves and located at one side of the fluted disc, the fluted disc further defined with plural cavities at another side thereof for receiving the steel balls, the wearing gasket corresponds to the steel balls in the cavities on another side of the fluted disc;
   a steel wire of a rock-arm assembly fixed to a another end of a rock arm after passing through the arm of the slider.

3. The anti-lock disc brake device as claimed in claim 2 wherein:
   the positioning assembly comprises a positioning bracket and a toothed board, the positioning bracket is assembled with the toothed board and then screw on the fork, at a side of the toothed board are provided with two positioning covers which are disposed in an arc, the arc between the two positioning covers corresponds to an axis of the brake disc, the positioning covers are respectively defined with a receiving hole, and a back plate is disposed at a bottom of the receiving hole, plural teeth are formed at a mid portion of the toothed board for meshing with a toothed plate, the toothed plate is also defined with teeth, the teeth are disposed between the two positioning covers;
   the slider comprises the base body and two sliding sleeves respectively disposed at an upper side and a lower side of the base body, the sliding sleeves are respectively defined with a receiving base at an end thereof, the receiving base of the sliding sleeve at a lower end of the base body is interiorly provided with cushion, the two sliding sleeves can respectively slide into the two positioning covers of the positioning assembly;

the spring, an end of which is received in the receiving base of the sliding sleeve at an upper end of the slider and another end of the spring abuts against the back plate of the positioning cover at an upper end of the positioning assembly;

the braking assembly includes the first braking unit and the second braking unit, the first braking unit comprises the brake pad, a retainer, an abrasive piece and an adjust cover;

the rock-arm assembly includes a steel wire, a rock arm, a cover and a spiral spring, the drive shaft of the braking assembly is disposed at an end of the rock arm after passing through the cover and the spiral spring.

4. The anti-lock disc brake device as claimed in claim 2 wherein the positioning assembly is integrally formed, both ends of which are defined with sliding grooves, and limiting covers are used to position two sliding sleeves at both sides of the slider, the base body is additionally provided with a spring seat for the reception of an end of the spring and at a corresponding position of the positioning assembly is provided with another spring seat, such that the slider is able to reciprocate within the sliding grooves.

5. The anti-lock disc brake device as claimed in claim 2, wherein the positioning assembly is provided with a rail and a slide cover, the base body can abut against and slide on the rail, the base body is additionally provided with a spring seat for reception of an end of the spring, and at a corresponding position of a toothed board is defined with another spring seat, such that the slider is able to reciprocate circularly within sliding grooves.

6. The anti-lock disc brake device as claimed in claim 2, wherein the positioning assembly is integrally formed, which is provided at both ends thereof with two opposing slide shafts, the both ends of the base body of the slider are provided with ears which defined with arc apertures, the arc apertures of the ears at both ends of the base body are provided for the insertion of the slide shaft, such that the slider is able to circularly reciprocate within sliding grooves, the base body is additionally provided with a spring seat for the reception of an end of the spring and at a corresponding position of the positioning assembly is provided with another spring seat.

7. The anti-lock disc brake device as claimed in claim 2, wherein the positioning assembly is integrally formed, two opposing T-shape arc grooves are defined at both ends of positioning covers, and two T-shape slide blocks are disposed at the end of the sliding sleeves at both ends of the base body which are used to insert in the T-shape arc grooves, by the cooperation of the T-shape arc grooves with the T-shape slide blocks, the base body can perform reciprocating circular movement in the T-shape arc grooves, the base body is additionally provided with a spring seat for the reception of an end of the spring and at a corresponding position of the positioning assembly is provided with another spring seat.

8. The anti-lock disc brake device as claimed in claim 2, wherein the positioning assembly is integrally formed, a plate protrudes from a side of the base body of the slider and the plate is pivotally connected to an axis of the brake disc, by the cooperation of the plate with the axis of the brake disc, the base body can perform reciprocating circular movement in T-shape arc grooves, the base body is additionally provided with a spring seat for the reception of an end of the spring and at a corresponding position of the positioning assembly is provided with another spring seat.

9. The anti-lock disc brake device as claimed in claim 2, wherein the positioning assembly is defined with a track which is interiorly provided with spring seats for positioning two springs, the base body of the slider is divided into a left half and a right half, the left half and the right half are correspondingly provided outside of the track and positioned at both sides of the track by taking advantage of a chute board in an arc groove, on inner surface of arc groove are provided with spring seats, by the cooperation of the track with the springs and the chute board, the base body is able to perform reciprocating circular movement.

10. The anti-lock disc brake device as claimed in claim 2, wherein the positioning assembly is provided with a rail that is interiorly defined with recesses for the reception of the springs, in the recesses is further provided with spring seats that are used to position springs, the base body is defined with an arc hole, an arc-shape wearing sleeve is positioned between the arc hole and the rail by virtue of screw board, the screw board is defined with an abutting portion that is used to abut against a bottom of the recess of the rail, the springs are positioned by the spring seats and the abutting portion, the rail is confined in the arc hole, such that the base body has to circularly reciprocate.

* * * * *